United States Patent [19]

Kant

[11] Patent Number: 4,562,733
[45] Date of Patent: Jan. 7, 1986

[54] DEVICE FOR THE ELECTRIC MEASUREMENT OF A LIQUID LEVEL

[75] Inventor: Bernhard Kant, Eschborn, Fed. Rep. of Germany

[73] Assignee: VDO Adolf Schindling AG, Frankfurt am Main, Fed. Rep. of Germany

[21] Appl. No.: 620,851

[22] Filed: Jun. 15, 1984

[30] Foreign Application Priority Data

Jun. 15, 1983 [DE] Fed. Rep. of Germany ....... 3321559

[51] Int. Cl.$^4$ ............................................. G01F 23/00
[52] U.S. Cl. ................................... 73/295; 73/304 C; 340/620; 361/284; 138/122; 138/131; 174/47
[58] Field of Search ............ 73/290 R, 304 R, 304 C, 73/308, 327, 295; 220/855; 324/158 P, 60 C, 61 P, 65 P; 340/620, 618; 116/227; 361/284; 174/47; 138/121, 122, 120, 131

[56] References Cited

U.S. PATENT DOCUMENTS 3,050,999  8/1962  Edwards ........................... 324/61 P
3,324,722  6/1967  Reicks .................................. 73/295

FOREIGN PATENT DOCUMENTS 2922093  12/1980  Fed. Rep. of Germany .... 73/304 R
3235534   3/1984  Fed. Rep. of Germany .
 343189   1/1960  Switzerland .......................... 174/47

Primary Examiner—Charles Frankfort
Assistant Examiner—Thomas B. Will
Attorney, Agent, or Firm—Martin A. Farber

[57] ABSTRACT

A device for the electric measurement of the level of a liquid within a container has a protective tube (1) within which a conductive foil (2) is helically arranged. The conductive foil (2) is wound with such a pitch that sufficient space remains between its longitudinal edges (3, 3') to provide a helically extending flexible protective-tube region (16, 16') within the protective tube (1). This protective-tube region has inwardly and outwardly directed U-shaped tube sections (17, 18, 19). As a result of this development the protective tube (1) bends exclusively in those regions which are located between the longitudinal edges (3) of the conductive foil (2).

8 Claims, 2 Drawing Figures

DEVICE FOR THE ELECTRIC MEASUREMENT OF A LIQUID LEVEL

FIELD AND BACKGROUND OF THE INVENTION

The invention relates to a device for the electric measurement of a liquid level.

The invention relates particularly to a device for the electric measurement of the level of a liquid contained in a container, having a conductive foil, such as a temperature-dependent externally electrically heated resistance foil, immersed in the liquid and surrounded by a protective tube, the total resistance of which foil, detectable by an evaluation circuit, is dependent on the level of liquid in the container, or having a capacitance foil bearing two conductors which form a capacitor, the conductive foil being developed in strip-shape and being held in a helical shape by holding elements acting on its longitudinal edges within the protective tube in such a manner that the surface is washed over on both sides by the liquid, and the longitudinal edges of the conductive foil being spaced apart by a correspondingly large pitch from turn to turn.

German Patent No. 32 355 34 discloses such a device.

In this patent the prime objective was to create a device which makes it possible to measure a level with high precision. The helical development of the conductive foil stipulated in the above patent permits of a substantially greater length of the conductive foil than corresponds to its linear depth of immersion. In this way the wettable surface of the conductive foil becomes large so that the power of resolution of the measurement region becomes correspondingly large. Aside from this, the helical arrangement of the conductive foil makes it possible to bend the device as a whole in radial direction to a limited extent without the conductive foil being damaged.

Containers in which a liquid level must be measured are frequently of rather irregular shape. Automobile gasoline tanks frequently have very complicated shapes in order to make optimal use of the space available and to permit the largest possible tank volume. Such container developments frequently make it impossible for the device for the electric measurement of the liquid level to extend in a straight line down to the lowest point in the container. It is then necessary to bend the protective tube together with the conductive foil more strongly so that it can follow the construction of the container. In the device in accordance with the above patent, this possible flexibility was not sufficient in all cases.

It is an object of the invention further to develop a device of the aforementioned type in such a way that, while retaining the high precision of measurement, radial bending of the protective tube with the conductive foil installed in it is possible to the greatest possible extent.

SUMMARY OF THE INVENTION

According to the invention, a helically extending flexible protective-tube region (16, 16') is provided in a protective tube (1) between the longitudinal edges (3) of the conductive foil (2).

Due to the development in accordance with the invention, the protective tube (1) is flexible only between the longitudinal edges of the conductive foil which define the individual turns of the conductive foil. In this way the protective tube can be bent considerably without the conductive foil becoming excessively bent and thereby being possibly crumpling or tearing. The device in accordance with the invention does not require a protective tube of complicated shape; rather, the latter can be a simple plastic tube formed by extrusion or injection molding.

It is advantageous if the flexible protective-tube region (16, 16') has at least a U-shaped tube section extending radially inwards or outwards (17, 18, 19). In this way the flexibility of the protective tube is obtained by simple means in the desired region. Bending of the protective tube is possible with the exertion of only slight force.

Particularly easy bending of the protective tube with the conductive foil mounted is characterized by the fact that the flexible protective-tube region (16, 16') consists of two inwardly directed U-shaped tube sections (17, 18) and an outwardly directed U-shaped tube section (19) arranged between them. The inwardly directed U-shaped tube sections form resting edges for the longitudinal edges of the conductive foil. As a result, the conductive foil can easily be inserted from one end into the protective tube.

Undesirably strong stressing of the conductive foil by flexural forces can be dependably prevented if the protective tube (1) has a short, axially extending foil resting region (20, 20', 21) on both sides of the flexible protective-tube region (16, 16') and if these foil resting regions (for instance 20', 21) are connected by radially recoiling flexurally stiff protective-tube sections (22). The foil resting regions support the conductive foil well and make rapid assembly possible.

In order to obtain a high precision of measurement it is necessary that the conductive foil be washed around on all sides. This can easily be achieved by providing flow openings (23) in the flexurally-stiff protective-tube sections (22).

If it is desired to arrange a removal tube coaxially in the protective tube of the device of the invention, such removal tube must be held by spacers on the protective tube in such a manner that it cannot touch the conductive foil anywhere. The inwardly directed tube sections 17 in accordance with the invention make it possible to exert a double function. Aside from the fact that they establish the flexural region they can serve to hold the protective tube at a distance. In accordance with the invention, the inwardly directed U-shaped tube sections (17, 18) serve as guide for a removal tube which is pushed into the protective tube (1).

The invention permits of numerous possible embodiments.

In order to explain its basic principle one of said embodiments has been shown diagrammatically in the drawing and will be described below.

DETAILED DESCRIPTION OF THE PREFERRED EMBODIMENT

Figure 1:
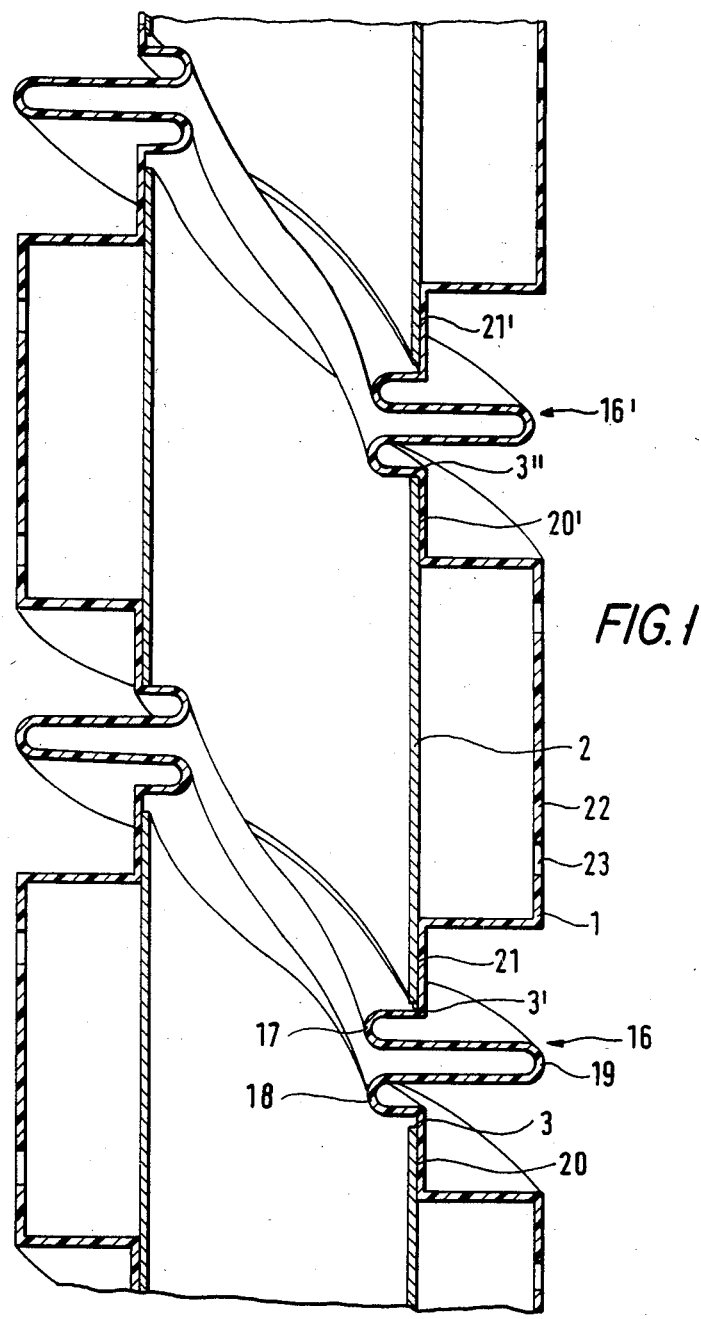
FIG. 1 shows a longitudinal section through a partial region of a protective tube with conductive foil, developed in accordance with the invention, of a device for the electric measurement of the level of a liquid.

FIG. 1 shows a protective tube 1 in which a strip-shaped conductive foil 2 having longitudinal edges 3 is helically arranged.

The pitch of the conductive foil 2 from turn to turn is so great there there is sufficient distance between the longitudinal edges 3, 3', 3" to provide there a helically extending, flexible protective-tube region 16, 16'. This protective-tube region 16, 16' consists of two radially inwardly directed U-shaped tube sections 17, 18 and an outwardly directed U-shaped tube section 19 arranged between them.

On both sides of the flexible protective-tube region 16, 16' the protective tube 1 has a short, axially extending foil-resting region 20, 21, 20' against which the conductive foil 2 rests. The transition from the foil-resting regions 20, 21 to the tube section 17, 18 takes place in each case by an abrupt 90° bend so that the foil 2, particularly upon insertion into the protective tube 1, can rest via its longitudinal edges 3, 3', 3" on the tube sections 17, 18. These foil regions 21, 20' between the flexible protective-tube regions 16, 16' are in each case connected by a radially recoiling, flexurally-stiff protective-tube section 22. In order that liquid can come against the outer wall surface of the conductive surface 2, passage openings 23 are provided in the protective-tube section 22.

The installing of the conductive foil 2 into the protective tube 1 is readily possible even with greater lengths of the protective tube. It is merely necessary to place the conductive foil 2 on two foil-resting regions 20', 21 between the flexible protective tube regions 16, 16' and then push the conductive foil 2 in from the end of the protective tube. The conductive foil 2 then automatically slides along the helical foil-resting region 20, 20' which is defined by the flexible protective-tube region 16, 16'.

Figure 2:
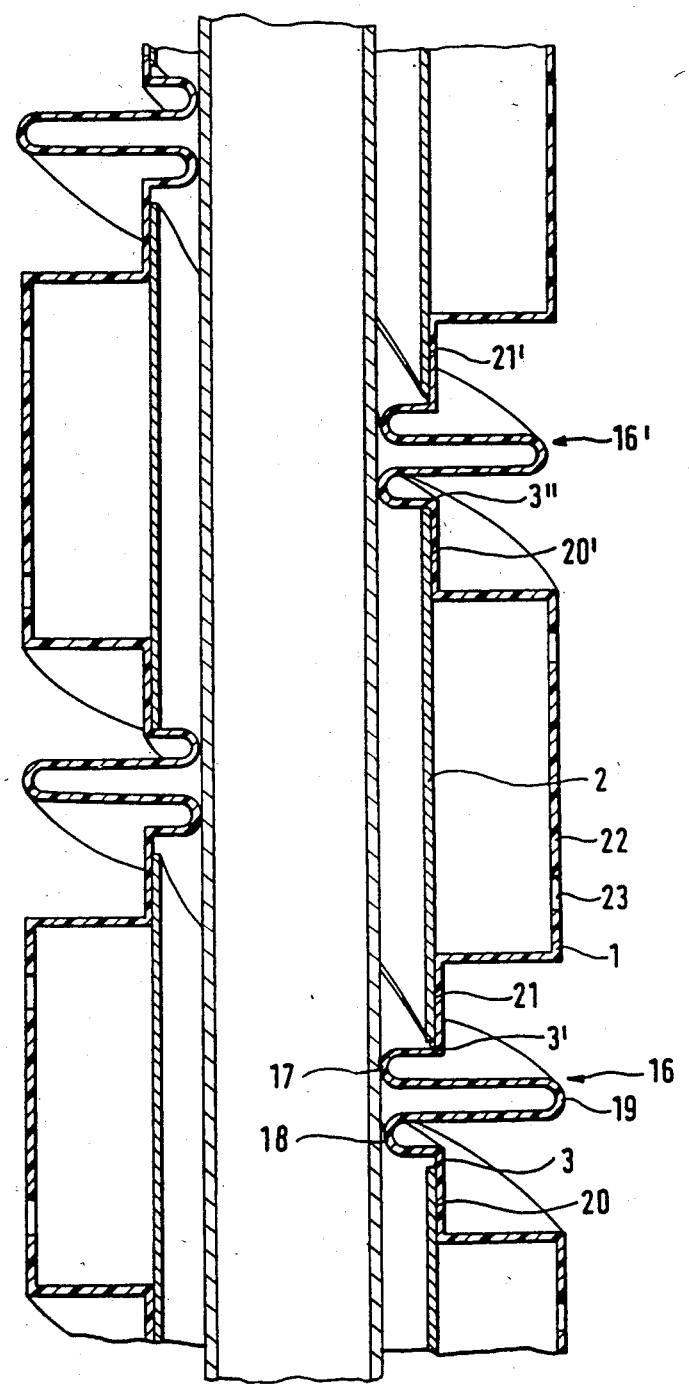
FIG. 2 shows the insertion of another tube into the protective tube of FIG. 1.

When a removal tube, shown in FIG. 2, is arranged within the protective tube the tube sections 17, 18 serve to hold it spaced from the conductive foil 2. The outside diameter of the removal tube must, for this purpose, be slightly less than the free cross section between the inwardly directed tube sections 17, 18.

In the case of an electrically externally heated resistance foil, the foil is heated by passing electric current through the resistance. Both terminals of the resistance are led to the upper end of the protective tube and are connected as the resistance probe in U.S. Pat. No. 4,361,037.

The foil serves as the probe for the measurement of the liquid level. For a probe comprising a capacitive foil a corresponding well known AC measurement circuit is used.

I claim:

1. In a device for the electric measurement of the level of a liquid contained in a container, the device having a conductive foil such as a temperature-dependent externally electrically heated resistance foil immersed in the liquid and surrounded by a protective tube, and wherein the total resistance of which foil is detectable by an evaluation circuit and is dependent on the level of liquid in the container, or alternatively wherein the device has a capacitance foil bearing two conductors which form a capacitor, and additionally wherein the conductive or capacitive foil is developed in strip-shape and is held in a helical shape by holding elements acting on its longitudinal edges within the protective tube in such a manner that a surface of the conductive or capacitive foil is washed over on both sides by the liquid, and the longitudinal edges of the conductive or capacitive foil being spaced apart by a correspondingly large pitch from turn to turn, the improvement wherein a helically extending flexible protective-tube region is provided in the protective tube between the longitudinal edges of the conductive or capacitive foil.

2. The device according to claim 1, wherein said flexible protective-tube region has at least one U-shaped tube section extending radially inwards or outwards.

3. The device according to claim 1, wherein said flexible protective-tube region comprises two inwardly directed U-shaped sections and an outwardly directed U-shaped section arranged between them.

4. The device according to claim 1, wherein said protective tube has a short, axially extending foil resting region on both sides of said flexible protective-tube region, said foil resting regions being connected by radially recoiling flexurally stiff protective-tube sections.

5. The device according to claim 4, wherein said flexurally stiff protective-tube sections define flow openings therein.

6. The device according to claim 3, wherein the inwardly directed U-shaped tube sections serve as guide for a removal tube which is pushed into the protective tube.

7. A liquid measurement device incorporating an electric element of which an electrical parameter, such as resistance or capacitance, varies in response to the amount of liquid in a container, the device comprising:

a tubular housing;

said element having an elongated strip-shape with opposed edges, said element being disposed along a helical path on an interior surface of said housing; and said housing including a helically-extending flexible protective-tube region comprising radially directed U-shaped tube sections disposed between the edges of said element to permit flexure of said housing at said protective-tube region without disturbing said element.

8. A device according to claim 7, wherein a portion of a wall of said housing is displaced outwardly away from said element and is provided with ports for admission of liquid to wash a back side of said element, said portion being disposed along a helix.

* * * * *